US012732882B2

(12) United States Patent
Demonget et al.

(10) Patent No.: US 12,732,882 B2
(45) Date of Patent: Sep. 8, 2026

(54) SYSTEM AND METHOD FOR COORDINATING DEDICATED AND MACRO RADIO ACCESS NETWORKS

(71) Applicant: Verizon Patent and Licensing Inc., Basking Ridge, NJ (US)

(72) Inventors: Sylvestre Demonget, Millburn, NJ (US); David Albert Rossetti, Randolph, NJ (US); Madhusudan Mandyam Bheemarayan, Hillsborough, NJ (US); Robert Walley, Canton, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 310 days.

(21) Appl. No.: 18/366,204

(22) Filed: Aug. 7, 2023

(65) Prior Publication Data

US 2025/0056360 A1 Feb. 13, 2025

(51) Int. Cl.
*H04W 36/30* (2009.01)
*H04W 36/32* (2009.01)

(52) U.S. Cl.
CPC ....... *H04W 36/304* (2023.05); *H04W 36/324* (2023.05)

(58) Field of Classification Search
CPC ......... H04W 36/00837; H04W 36/304; H04W 36/324
See application file for complete search history.

(56) References Cited

U.S. PATENT DOCUMENTS 9,686,727 B2 * 6/2017 Ness ................. H04W 52/0209
10,448,293 B2 * 10/2019 Ness ................... H04W 36/304
11,528,329 B2 * 12/2022 Gupta ................. H04L 63/1416
12,177,718 B2 * 12/2024 Chen ....................... H04L 65/80
12,284,561 B2 * 4/2025 Agarwal ............... H04W 36/08
2010/0240370 A1 * 9/2010 Pandit ................. H04W 36/385 455/436
2013/0331114 A1 * 12/2013 Gormley ............... H04W 28/18 455/452.1
2014/0073311 A1 * 3/2014 Xu .................... H04W 52/0206 455/418
2014/0226620 A1 * 8/2014 Zhou ..................... H04W 36/36 370/331
2015/0350974 A1 * 12/2015 Patil .................. H04W 36/0085 370/331

(Continued)

FOREIGN PATENT DOCUMENTS

CN 106658574 A * 5/2017 ............ H04W 24/04
CN 104756531 B * 4/2019 ............ H04W 16/08

(Continued)

*Primary Examiner* — Eric Nowlin

(57) ABSTRACT

A device may receive at least first network parameters and first performance indicators of a first access station in a first access network; receive at least second network parameters and second performance indicators of a second access station in a second access network; determine whether to steer a User Equipment device (UE) wirelessly connected to the first access station, from the first access station toward the second access station, based on the at least first and second network parameters and first and second performance indicators; and based on the determination, modify one or more of the first network parameters of the first access station and the second network parameters of the second access station.

20 Claims, 9 Drawing Sheets

(56) References Cited

U.S. PATENT DOCUMENTS

| | | | | |
|---|---|---|---|---|
| 2016/0381630 | A1* | 12/2016 | Krishnamoorthy | H04W 76/14 370/329 |
| 2017/0034706 | A1* | 2/2017 | Ericson | H04W 16/04 |
| 2017/0127427 | A1* | 5/2017 | Claridge | H04W 72/542 |
| 2017/0208514 | A1* | 7/2017 | Saily | H04L 67/1053 |
| 2017/0215105 | A1* | 7/2017 | Tan Bergström | H04W 28/0865 |
| 2017/0295526 | A1* | 10/2017 | Ness | H04W 36/0094 |
| 2018/0167870 | A1* | 6/2018 | Masini | H04W 48/16 |
| 2018/0206184 | A1* | 7/2018 | Bahr | H04W 24/02 |
| 2018/0368037 | A1* | 12/2018 | Wang | H04W 28/0205 |
| 2019/0045403 | A1* | 2/2019 | Cui | H04W 36/0061 |
| 2019/0380076 | A1* | 12/2019 | Wang | H04W 76/10 |
| 2020/0336940 | A1* | 10/2020 | Salkintzis | H04W 28/082 |
| 2021/0168685 | A1* | 6/2021 | Dowlatkhah | H04W 76/16 |
| 2021/0352151 | A1* | 11/2021 | Gupta | H04L 67/148 |
| 2021/0385671 | A1* | 12/2021 | Kerpez | H04W 72/542 |
| 2022/0264360 | A1* | 8/2022 | Chen | H04L 65/765 |
| 2022/0353774 | A1* | 11/2022 | Agarwal | H04W 36/304 |
| 2023/0030173 | A1* | 2/2023 | Ck | H04W 28/0861 |
| 2023/0100136 | A1* | 3/2023 | Kanakaraj | H04L 41/5009 370/230.1 |
| 2023/0128225 | A1* | 4/2023 | Xiang | H04W 36/14 370/329 |
| 2023/0156573 | A1* | 5/2023 | Lu | H04W 72/56 370/338 |
| 2023/0413112 | A1* | 12/2023 | Dakshinkar | H04W 28/0967 |
| 2025/0031112 | A1* | 1/2025 | Ajami | H04W 8/02 |
| 2025/0247719 | A1* | 7/2025 | Yan | H04L 41/16 |

FOREIGN PATENT DOCUMENTS

| | | | | |
|---|---|---|---|---|
| EP | 3335476 B1 * | 5/2019 | | H04W 24/02 |
| WO | WO-2015042794 A1 * | 4/2015 | | H04W 16/08 |
| WO | WO-2017030477 A1 * | 2/2017 | | H04W 24/02 |
| WO | WO-2017133765 A1 * | 8/2017 | | H04W 4/50 |

* cited by examiner

100

RAN COORDINATOR (RC) 214

ACCESS NETWORK 204-1

OAM 212-1

PARAMETERS & ANALYTICS

PARAM CHANGES

ACCESS STATION 210-1

ACCESS NETWORK 204-2

OAM 212-2

PARAMETERS & ANALYTICS

PARAM CHANGES

ACCESS STATION 210-2

UE 102

200
UE 102
UE 102
UE 102
UE 102
UE 102
UE 102
ACCESS NETWORK 204-1
ACCESS STATIONS 210-1
OAM 212-1
RC 214
UI 220
SON AI/ML 224
ACCESS NETWORK 204-2
OAM 212-2
ACCESS STATIONS 210-2
CORE NETWORK 206-1
NEF 216-1
NWDAF 218-1
CORE NETWORK 206-2
NEF 216-2
NWDAF 218-2
DN 208
DN 208
DN 208
DN 208
DN 208
DN 208

300
FREQUENCY CHANNEL F2
MACRO CELL 306
RADIO LINK 310
ACCESS STATION 210-3
FREQUENCY CHANNEL F1
MACRO CELL 302
DEDICATED CELL 304
RADIO LINK 308
ACCESS STATION 210-1
UE 102 (1)
UE 102 (2)
ACCESS STATION 210-2

300

FREQUENCY CHANNEL F3

MACRO CELLS 416

FREQUENCY CHANNEL F2

402

404

MACRO CELL 414

RADIO LINK 406

ACCESS STATION 210-3

FREQUENCY CHANNEL F1

MACRO CELL 410

DEDICATED CELL 412

RADIO LINK 408

ACCESS STATION 210-1

UE 102 (1)

UE 102 (2)

ACCESS STATION 210-2

| UE TYPE | LOAD AT MACRO NETWORK FOR MNO1 | PUSH TO NHN |
|---|---|---|
| NR-CAPABLE DEVICE, SUBSCRIBER OF MNO1 | HIGH | YES |
| | LOW | NO |
| LTE-ONLY CAPABLE DEVICE, SUBSCRIBER OF MNO 1; NR-CAPABLE DEVICE, SUBSCRIBER OF OTHER MNOs | HIGH | YES |
| | LOW | YES |

| DOMAINS | INPUT | ACTION | OUTOUT |
| --- | --- | --- | --- |
| **MOBILITY, LOAD BALANCING** | CURRENT CAPACITY FOR PUBLIC SUBSCRIBERS ON TARGET DEDICATED CELL; PREDICTED LOAD FROM PRIVATE SUBSCRIBERS | KEEP PUBLIC SUBSCRIBERS (WHICH ARE MOVING TOWARD DEDICATED NETWORK) LONGER ON SOURCE MACRO CELL AND/OR PUSH THEM TO ANOTHER MACRO CELL WITH OVERLAPPING COVERAGE | RAISE threshX_high FOR TARGET DEDICATED CELL; RAISE EVENT A5 THRESHOLD2 AND LOWER EVENT A5 THRESHOLD1 |
| **CA/DC, LOAD BALANCING** | TARGET DEDICATED CELL HAS NO EN-DC CAPABILITY TOWARD MACRO C-BAND CELLS; HAS INTRA-BAND CA CAPABILTY WITH PREDICTED CAPACITY LOWER THAN THAT OF MACRO C-BAND | KEEP PUBLIC SUBSCRIBERS (WHICH ARE MOVING TOWARD DEDICATED NETWORK) LONGER ON SOURCE MACRO CELL AND/OR PUSH THEM TO ANOTHER MACRO CELL WITH EN-DC CAPABILITY WITH C-BAND | SAME AS ABOVE; AND/OR INPUT THE EN-DC RELATIONS CONFIGURED ON TARGET DEDICATED CELL TO A PROPRIETARY FEATURE AVAILABLE ON MACRO NETWORK |
| **QoS** | QCI, ARP, GBR, AMBR FOR MAIN SERVICES PER MNO POLICY | IDENTIFY POSSIBLE DISCREPANCIES IN QoS ATTRIBUTES FOR SIMILAR SERVICES ACROSS MNOs. FORCE THE SCHEDULER RUNNING ON DEDICATED NODES TO BEHAVE FAIRLY ACROSS MNOs. | IF MNO1 AND MNO2 USE QCI 8 AND QCI 9 FOR THE SAME SERVICE, MAP MNO2 TO QCI 8 ON THE DEDICATED NODES TO ALIGN SCHEDULER PRIORITIES |

800

SYSTEM AND METHOD FOR COORDINATING DEDICATED AND MACRO RADIO ACCESS NETWORKS

BACKGROUND INFORMATION

A radio access network (RAN) is one portion of a cellular network. A RAN allows wireless communication devices, such as mobile phones, to connect to the cellular network over radio frequency (RF) links. Over time, RANs have become more hybrid, with deployment of small cell layers on top of an existing macro layer and with integration of private networks with a macro network, and with emergence of neutral-host networks (NHNs) for hosting multiple Mobile Network Operators (MNOs) on a common infrastructure. Consequently, the ownership and control of cellular networks are becoming more fragmented while the overall performance of the RANs is becoming more dependent on the constituent RANs.

BRIEF DESCRIPTION OF THE DRAWINGS

FIG. 6 shows a table that summarizes example steering of User Equipment devices (UEs) performed by a RAN coordinator, according to an implementation;

FIG. 7 illustrates a table of input to and output from a RAN coordinator, according to an implementation;

DETAILED DESCRIPTION

Figure 1:
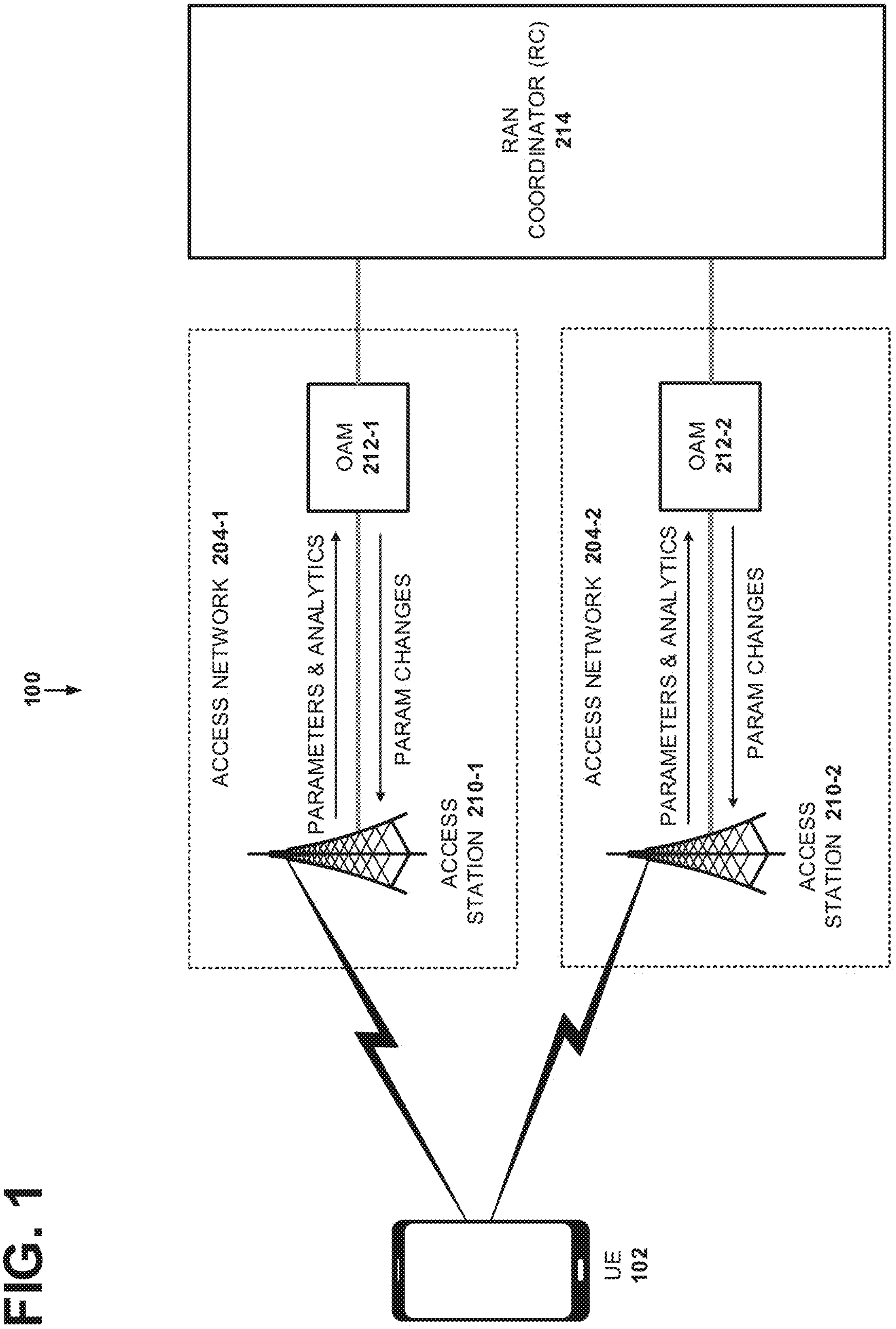
FIG. 1 illustrates an overview of a system for coordinating access stations in one or more radio access networks (RANs), according to an implementation.

The following detailed description refers to the accompanying drawings. The same reference numbers in different drawings may identify the same or similar elements. As used herein, the terms "service provider" and "provider network" may refer to, respectively, a provider of communication services and a network operated by the service provider. In addition, the term "public network" may refer to a cellular network that is available for use or subscription by a general public, and the term "private network" may refer to a cellular network that is available to members of a private organization. A private network and a public network may be operated by the same entity or different entities. A private network may be coupled to a portion of the public network, such as an access network.

As used herein, the term "neutral host network" (NHN) may refer to a cellular network that offers wireless services to a number of service providers (also referred to as Mobile Network Operators (MNOs)) to subscribers. An NHN may be operated and maintained by one of the involved MNOs, or by a neutral third party unassociated with a specific telecommunication service provider. An NHN allows the owner of a building, campus, venue, etc., to provide robust cellular coverage to their employees, visitors, etc. in a cost-effective manner, by deploying a common layer of RAN equipment for different MNOs.

As used herein, the term "small cell" or "small node" may refer to a base station with a limited range (e.g., hundreds of feet). In contrast, the term "macro cell" or "macro node" may refer to a base station with a longer range. Relatively inexpensive and small in size, small cells may be deployed in large numbers in a given area (e.g., a building, a park, a stadium, etc.) to provide strong signals and high data rates. Examples of small cells include femtocells, picocells, and microcells. Depending on the context, the terms "cell," "node," "access station," and "base station" may be used interchangeably. Depending on the context, the term "cell" may refer to a coverage area of a base station or to both the base station and the coverage area.

Systems and methods described herein relate to coordinating access stations in one or more radio access networks (RANs). The systems may reconfigure the access stations in order to guide User Equipment devices (UEs) (e.g., a smart phone) away from one subset of the access stations to another subset of the access stations. In today's macro networks (e.g., a public network), it is possible to build or integrate dedicated nodes (e.g., cells or access stations serving a specific purpose, such as providing in-building coverage to a corporate campus) that are accessible to both private and public subscribers via RAN sharing (e.g., Multi Operator Core Network (MOCN)) and by using unlicensed or licensed spectrum. Presently, traffic from both private and public network subscribers (also referred to as private subscribers and public subscribers) may be serviced by dedicated nodes, and the mobility between the dedicated network (e.g., a private network or an NHN) and surrounding macro network may be handled in a mostly predetermined fashion. This may result in suboptimal radio resource allocation and UE mobility behaviors, leading to subpar Key Performance Indicator (KPI) values or network failures that impact both private and public subscribers. The systems described herein include a RAN coordinator to manage dedicated nodes and surrounding macro nodes in a dynamic and coordinated fashion. The systems may influence UE mobility, load balancing, carrier aggregation (CA), dual connectivity (DC), Quality-of-Service (QOS) parameters, and other features of telecommunication networks to balance the traffic and optimize the user experience. The systems may use data abstraction or call Application Programming Interfaces (APIs) to facilitate information exchange between different Operation, Administration, and Maintenance systems (OAMs).

FIG. 1 illustrates an overview of an exemplary system 100 for coordinating access stations in one or more RANs, according to an implementation. As shown, system 100 may include a UE 102, an access station 210-1 located in access network 204-1, an access station 210-2, located in access network 204-2 and which may be a neighbor of access station 210-1, an OAM 212-1, an OAM 212-2, and a RAN coordinator 214. UE 102 may connect to either access station 210-1 or access station 210-2.

OAM 212-1 may obtain, from access station 210-1 and other network components, operating parameters of access station 210-1, such as the number of UEs that are allowed to connect wirelessly to access station 210-1, the frequency bands used by access station 210-1, the number and bandwidth of channels for each frequency band, etc. OAM 212-1 may also obtain, from access station 210-1 and other network components, network analytics pertaining to access station 210-1, such as the number of UEs wirelessly connected to access station 210-1, the radio resource utilization for each channel, the signal-to-interference-plus-noise ratio (SINR) for each connection, the throughput and latencies for each connection, the access station aggregate traffic, etc. Similarly, OAM 210-2 may obtain operating parameters of access station 210-2 and network analytics pertaining to access station 210-2. Each of OAM 210-1 and OAM 210-2 has the ability to configure parameters for the access stations that it manages.

RAN coordinator 214 may receive the values of operating parameters and the network analytics of access stations 210-1 and 210-2 from OAMs 212-1 and 212-2, and other network components, such as a Network Exposure Function (NEF) and a Network Data Analytics Function (NDWAF). Based on the received operating parameter values and the analytics, RAN coordinator 214 may infer the relative load conditions at each of access stations 210-1 and 210-2 and/or the relative load conditions of the access networks 204-1 and 204-2. Based on the relative load conditions, RAN coordinator 214 may determine a target load (e.g., a target number of connected UEs, a target radio resource utilization, or a combination of such metrics) for each of access stations 210-1 and 210-2 and forward instructions for parameter changes to OAMs 212-1 and 212-2 to reconfigure each of access stations 210-1 and 210-2, so that each of access stations 210-A and 210-B handles appropriate traffic load.

In one example operation, assume that access stations 210-1 and 210-2 have an overlapping coverage area and that access station 210-1 is handling less traffic relative to access station 210-2. Also assume that, based on the operating parameter values and the network analytics for access station 210-1 and access station 210-2, RAN coordinator 214 determines that in the near future (e.g., within next 30 minutes), access station 210-2 is likely to experience increased traffic. Accordingly, RAN coordinator 214 may instruct OAM 212-1 and OAM 212-2 to reconfigure, respectively, access stations 210-1 and 210-2 to guide UEs in the overlapping coverage area to connect to, if possible, access station 210-1 rather than access station 210-2.

Given that UE 102 is capable of connecting to either access station 210-1 or 210-2, UE 102 would connect to access station 210-1. By guiding UEs to connect to particular cells, RAN coordinator 214 may load balance network traffic across multiple cells and/or access networks and permit more optimal allocation of network resources (e.g., avoid conditions where one cell is overloaded and the neighboring cell has no traffic).

Figure 2:
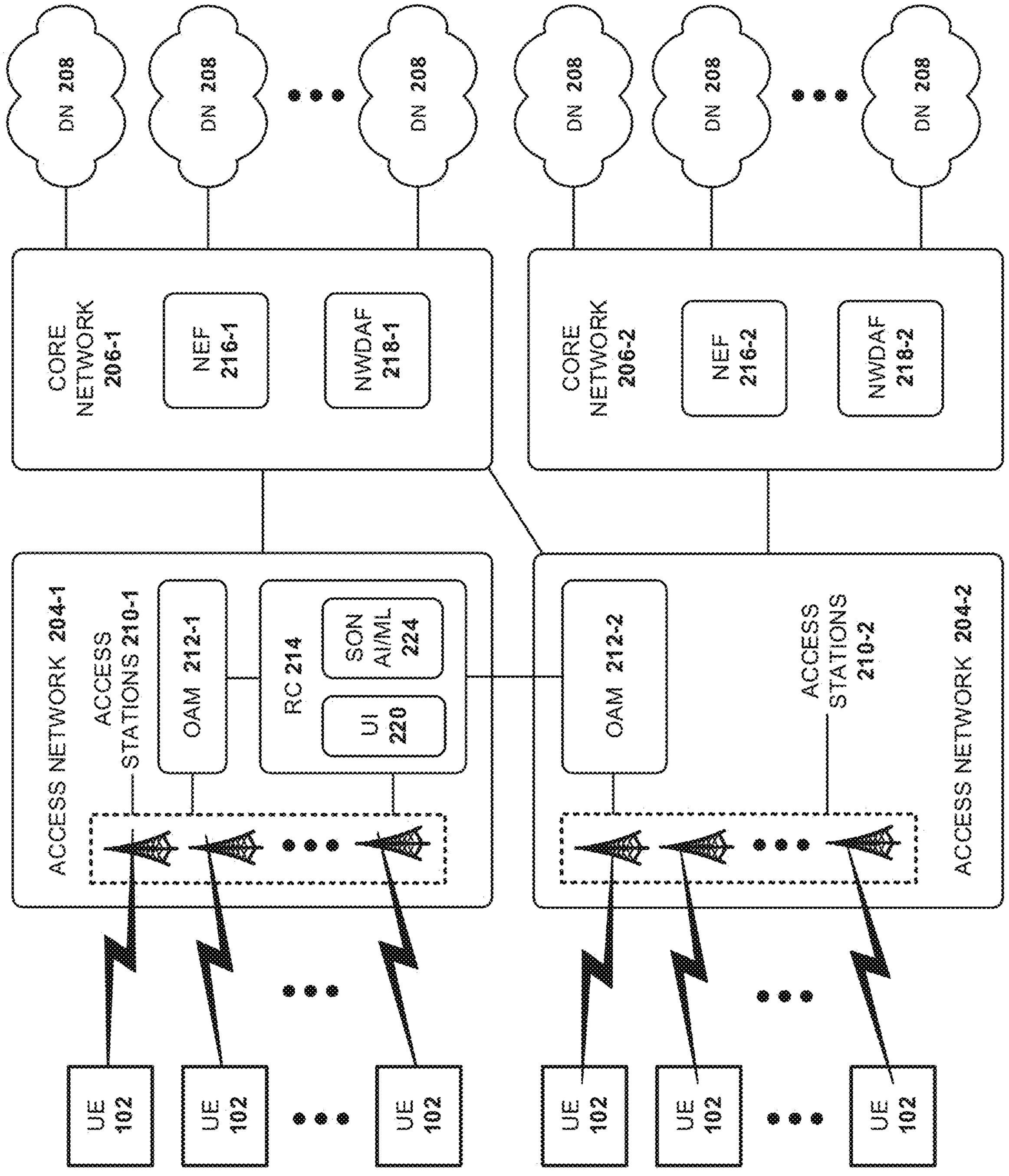
FIG. 2 illustrates an exemplary network in which systems and methods described herein may be implemented.

FIG. 2 illustrates an exemplary network environment 200 in which the system and methods may be implemented. As shown, environment 200 may include UEs 102 (generically referred to as UE 102), access networks 204-1 and 204-2 (generically referred to as access network 204), core networks 206-1 and 206-2 (generically referred to as core network 206), and data networks (DN) 208 (generically referred to as data network 208). Access network 204-2, core networks 206, and data networks 208 may be part of a multicore network. As the term "multicore" indicates, a multicore network may include more than one core network. Example implementations of a multicore network that shares parts or all of the RAN include a MOCN, a Multi-Operator Radio Access Network (MORAN), and a Public Network Integrated Non-Public Network (PNI-NPN).

UEs 102 may include wireless communication devices capable of Fifth Generation (5G) New Radio (NR), Fourth Generation (4G) Long-Term Evolution (LTE) communication capabilities and/or both LTE and 5G NR communication capabilities. Examples of UE 102 include: a smart phone; a tablet device; a wearable computer device (e.g., a smart watch); a laptop computer; a portable gaming system; an autonomous vehicle navigation system; an Internet-of-Things (IoT) device, a Machine-Type Communication (MTC) device; a Fixed Wireless Access (FWA) device; or a Customer Premises Equipment (CPE). In the example of FIG. 2, some UEs 102 may subscribe to core network 206-1 and other UEs 102 may subscribe to core network 206-2. Some of UEs 102 may connect to core network 206-1 through access network 204-1; some UEs 102 may connect to core network 206-1 through either access networks 204-1 and 204-2; and some UEs 102 may connect to core network 206-2 only through access network 204-2.

Access network 204-1 (also referred to as a macro network) and access network 204-2 (also referred to as a dedicated network) may allow UE 102 to access core networks 206. To do so, access networks 204 may establish and maintain, with participation from UE 102, an over-the-air channel with the customer devices; and maintain backhaul channels with core networks 206. Access network 204 may relay information through such channels, from UEs 102 to core network 206 and vice versa. Access network 204 may include an LTE and/or a 5G NR radio network, or another advanced radio network. These networks may each include multiple base stations comprised of many central units (CUs), distributed units (DUs), and radio units (RUS). The base stations, which may be used for establishing and maintaining over-the-air channel with UEs 102, are illustrated in FIG. 2 as access stations 210-1 (also referred to as macro cells 210-1 or macro nodes 210-1) and access stations 210-2 (also referred to as dedicated cells 210-2 or dedicated nodes 210-2). In some implementations, access stations 210 may include a 4G (e.g., eNB), 5G (e.g., gNB), or another type of access station that comprises one or more radio frequency (RF) transceivers.

As further shown, access network 204-1 may also include OAM 212-1 and RAN coordinator (RC) 214, and access network 204-2 may include OAM 212-2. The OAMs 212 may manage a different set of access stations and may be coupled to RAN coordinator 214. Each OAM 212 may be included in or connected to a different access network 204 and may configure, administer, and maintain corresponding access stations 210. For example, OAM 212-1 may manage access stations 210-1 and OAM 212-2 may manage access stations 210-2.

OAM 212-1 and OAM 212-2 (generically referred to as OAM 212) may receive access station operating parameters (e.g., the number and bandwidth of uplink/downlink channels for each frequency band, a per-frequency priority for cell selection/reselection, a minimum required RX level at the RU, a maximum TX power of the RU, RX level thresholds at the UE for inter/intra-frequency cell reselection to a high/lower priority cell, RX level thresholds and time-to-trigger intervals for inter/intra-frequency handovers, etc.); and/or configure access station 210 (i.e., set operating parameters of an access station 210). Examples of configuring an access station include changing thresholds in dB and time-to-trigger intervals in milliseconds (ms) for determining whether a primary/neighboring cell measurement used for handover purposes has become worse or better than the thresholds.

OAMs 212 may receive, from access stations 210, network topology parameters and data. Examples of topology parameters include cells location/azimuth, cell IDs, cells uplink and/or downlink frequency band, carrier aggregation (CA)/dual connectivity (DC) relations, neighboring relations to other cells via X2/Xn interface, nominal capacity and throughput specifications of the RAN equipment, RAN architecture, etc.

In addition to the above-described parameters, each OAM 212-1 and 212-2 may receive network analytics (also referred to as performance data) and process them to compute key performance indicators (KPIs) associated with each access station 210. Examples of KPIs include a cell load, a call setup rate, a handover success rate, a dropped call rate, etc. They may be computed per cell or per UE, with time stamps associated with each value sample. OAMs 212 may store RAN topology parameter values, the operating parameter values of access stations 210, the network analytics, and the KPIs in their respective local databases. The RAN topology parameter values and operating parameter values may be obtained by RAN coordinator 214 directly from OAMs 212 or, additionally or alternatively, via a Network Exposure Function (NEF) 216 described further below. The network analytics and KPIs may be obtained by RAN coordinator 214 directly from OAMs 212 or, additionally or alternatively, via a Network Data Analytics Function (NWDAF) 218 described further below.

RAN coordinator 214 may request RAN topologies from each OAM 212, operating parameters of access station 210 that OAM 212 manages, and their KPIs. RAN coordinator 214 may identify a number of important parameters and indicators from the information received from OAMs 212 based on its knowledge of the proprietary RAN object structure and parameter nomenclature of a given RAN/OAM vendor. In some implementations, RAN coordinator 214 may leverage application programming interfaces (APIs) through which a vendor may expose some of the information.

RAN coordinator 214 may provide RAN topology and access station operating parameters obtained from one OAM 212 to another OAM 212. RAN coordinator 214 may thus provide visibility into a group of access stations 210 managed by one OAM to neighboring access stations managed by another OAM. Although operating parameters of access stations 210 managed by one OAM may be visible to the other OAM, the operating parameters may not be directly modifiable by the other OAM. In addition, RAN coordinator 214 may provide network analytics and KPIs obtained from one OAM 212 to another OAM 212. When sharing analytics and KPI data, RAN coordinator 214 may apply filtering or aggregation methods to comply with user privacy rules.

When an inter-eNB/gNB connection interface (e.g., an X2 or Xn interface) is available between access stations 210 that belong to different access networks (e.g., access network 204-1 and access network 204-2), load information may be exchanged over the interface between neighbor base stations as per standards. In some implementations, new information elements (IEs) may be specified to allow for more granular load information sharing between access stations 210 than IEs currently allowed by the standards (e.g., in "Resource Status Request" X2 procedure). For instance, the new IEs may provide a breakdown of the loads according to different types of subscribers connected to a given access station or cell, such as private/public subscribers and subscribers of different MNOs. When an X2/Xn interface is not available, RAN coordinator 214 may facilitate load information exchange between neighbor access stations 210 that belong to different access networks, such as via API calls from/to OAMs 212.

By using the RAN topology, the access station operating parameters, the network analytics and KPIs pertaining to two or more RANs it oversees, RAN coordinator 214 may influence UE mobility, load balancing, CA/DC, and/or Quality-of-Service (QOS) parameters. By its influence, RAN coordinator 214 may not only load balance the traffic between the different access networks 204 in a more optimal way, but also enhance the user experience, such as increasing the user throughput, reducing the latency, or minimizing disruptions associated with handovers.

For example, when configuring an access station 210-1, RAN coordinator 214 may request OAM 212-1 to modify particular parameters, such as priority, threshX_high and/or Q_RxLevMin on access station 210-1 for the frequency of a target cell in access network 204-2, and/or other cell reselection parameters, to force idle UEs 102 moving from a cell in access network 204-1 toward a cell of access network 204-2 to reselect the particular cell of access network 204-2, or conversely to keep UEs 102 longer on the cell of access network 204-1. For UEs in the connected mode, RAN coordinator 214 may similarly request OAM 212-1 to modify Event A5 threshold1 and threshold2 parameters on access station 210-1 for the frequency of a target cell in network 204-2, to expedite handovers, or conversely to delay handovers from access network 204-1 to access network 204-2.

In some use cases, rather than directly requesting OAMs 212 to set operating parameters of access stations 210 to new values, RAN coordinator 214 may facilitate the use of certain existing RAN features or algorithms with proprietary RAN vendor implementation, such as "inter-frequency load balancing at call release." Specifically, when such a proprietary RAN feature does not work (e.g., due to access stations 210 belonging to two different RANs from different vendors, thus resulting in missing input parameters), RAN coordinator 214 may provide, to one OAM 212, otherwise missing input parameter values from the other OAM 212 that would allow the feature to operate. For instance, RAN coordinator 214 may provide cell bandwidths and load levels in the frequency bands of access stations 210-1 managed by OAM 212-1 to another OAM 212-2 that would use the values to support an Inter Frequency Load Balancing (IFLB) feature, to bring back some UEs 102 to access stations 210-1 when access stations 210-2 become overloaded.

As further shown, in one implementation, RAN coordinator 214 may provide a User Interface (UI) 220 for an administrator of one access network 204 to gain visibility into parameters of other access networks 204 coupled to RAN coordinator 214. As default, the administrator may not have the privilege to directly modify one or more parameters of other access networks 204 but may suggest such changes via UI 220, which may notify the other OAM 212 and its administrator. When the access network 204 whose parameter the administrator wants to modify receives an approval for the modification, either automatically approved by the target OAM 212 based on predefined rules (e.g., no more than a predetermined dB change per day for cell reselection parameters) or manually approved by its administrator, the parameter value may then be reset to the suggested new value for the target access station 210 via the corresponding OAM 212.

In some implementations, RAN coordinator 214 may employ Self-Optimizing Network (SON) techniques or Artificial Intelligence/Machine Learning (AI/ML) 224 algorithms to process operating parameters of access stations 210, network analytics, and KPIs, and utilize the datasets to predict the traffic patterns, available capacity, and potential throughput on access stations 210 on certain days and at certain times of the day. RAN coordinator 214 may utilize this added intelligence when providing operating parameter values to OAMs 212 for reconfiguration. For instance, RAN coordinator 214 may predict a lower load on access stations 210 incurred from a particular set of UEs 102 (e.g., employee devices or IoT modules in manufacturing robots) for a weekend, and may adjust operating parameter values for OAMs 212 to accept more of other UEs 102 (e.g., public subscribers) on those access stations 210 than usually permitted.

As used herein, the term "network parameters" may refer to one or more of network topology and operating parameters; and the term "performance indicators" may refer to one or more of network analytics and KPIs.

Core networks 206-1 and 206-2 may each include one or more devices and network components for providing communication services to UEs 102. For example, core network 206 may permit UEs 102 to attach to the multicore network (e.g., a Public Land Mobile Network (PLMN) comprising access network 204-2 and core networks 206-1 and 206-2), establish sessions with devices (e.g., a server) in the multicore network, and/or receive services from the multicore network (e.g., receive content, access the Internet, conduct video conferences with other UEs 102 attached to the multicore network). To deliver various services, core networks 206 may interface with other networks, such as data networks 208.

Depending on the implementation, core network 206 may include 5G core (5GC) network components or 4G/LTE core (Evolved Packet Core (EPC)) network components. For example, core networks 206-1 and 206-2 may include NEFs 216-1 and 216-2 (generically referred to as NEF 216) and Network Data Analytics Functions (NWDAFs) 218-1 and 218-2 (generically referred to as NWDAF 218). NEF 216-1 may expose network component capabilities and events pertaining to corresponding core network 206-1 and/or data networks 208 to other network functions (NFs) within the network, and/or to devices and NFs external to core network 206-1, including third-party network functions. That is, NEF 216-1 may permit a device or a component external to core network 206-1 to access network functions, programs, or devices in core network 206-1. NEF 216-2 may function similarly as NEF 216-1 but with respect to core network 206-2.

NWDAFs 218 may collect analytics information associated with various components of access networks 204 and core networks 206, and/or data networks 208. For example, NWDAF 218 may collect accessibility Key Performance Indicators (KPIs) (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

In some implementations, NWDAFs 218 may provide OAMs 212 some KPIs that may be used to evaluate the performance of access stations 210.

Data networks 208 may include one or more networks connected to core networks 206. In some implementations, a particular data network 208 may be associated with a data network name (DNN) in 5G and/or an Access Point Name (APN) in 4G. UE 102 may request a connection to data network 208 using a DNN or APN. Each data network 208 may include, and/or be connected to and enable communications with a local area network (LAN), a wide area network (WAN), a metropolitan area network (MAN), an autonomous system (AS) on the Internet, an optical network, a cable television network, a satellite network, another cellular network (e.g., a Code Division Multiple Access (CDMA) network or a general packet radio service (GPRS) network), an ad hoc network, a telephone network (e.g., the Public Switched Telephone Network (PSTN)), an intranet, or a combination of such networks. Data network 208 may include an application server (also referred to as Application Function (AF)). An AF may provide services for a program or an application running on UEs 102 and may establish communication sessions with UEs 102 via core network 206.

For clarity, FIG. 2 does not show all components that may be included in network environment 200 (e.g., routers, bridges, wireless access points, data centers, portals, additional access networks 204, additional OAMs 212, additional core networks 206, etc.). Depending on the implementation, network environment 200 may include additional, fewer, different, or a different arrangement of components than those illustrated in FIG. 2. Furthermore, in different implementations, the configuration of network environment 200 may be different. For example, in FIG. 2, OAM 212-1 and RAN coordinator 214 are illustrated as included in access network 204-1; and OAM 212-2 is illustrated as included in access network 214-2. In other implementations, an OAM 212 and/or RAN coordinator 214 may be included in a core network 212 or hosted in a third-party cloud environment. In some implementations, a RAN coordinator 214 may be coupled to more than two OAMs 212, thus coordinating more than two access networks 204.

Figure 3:
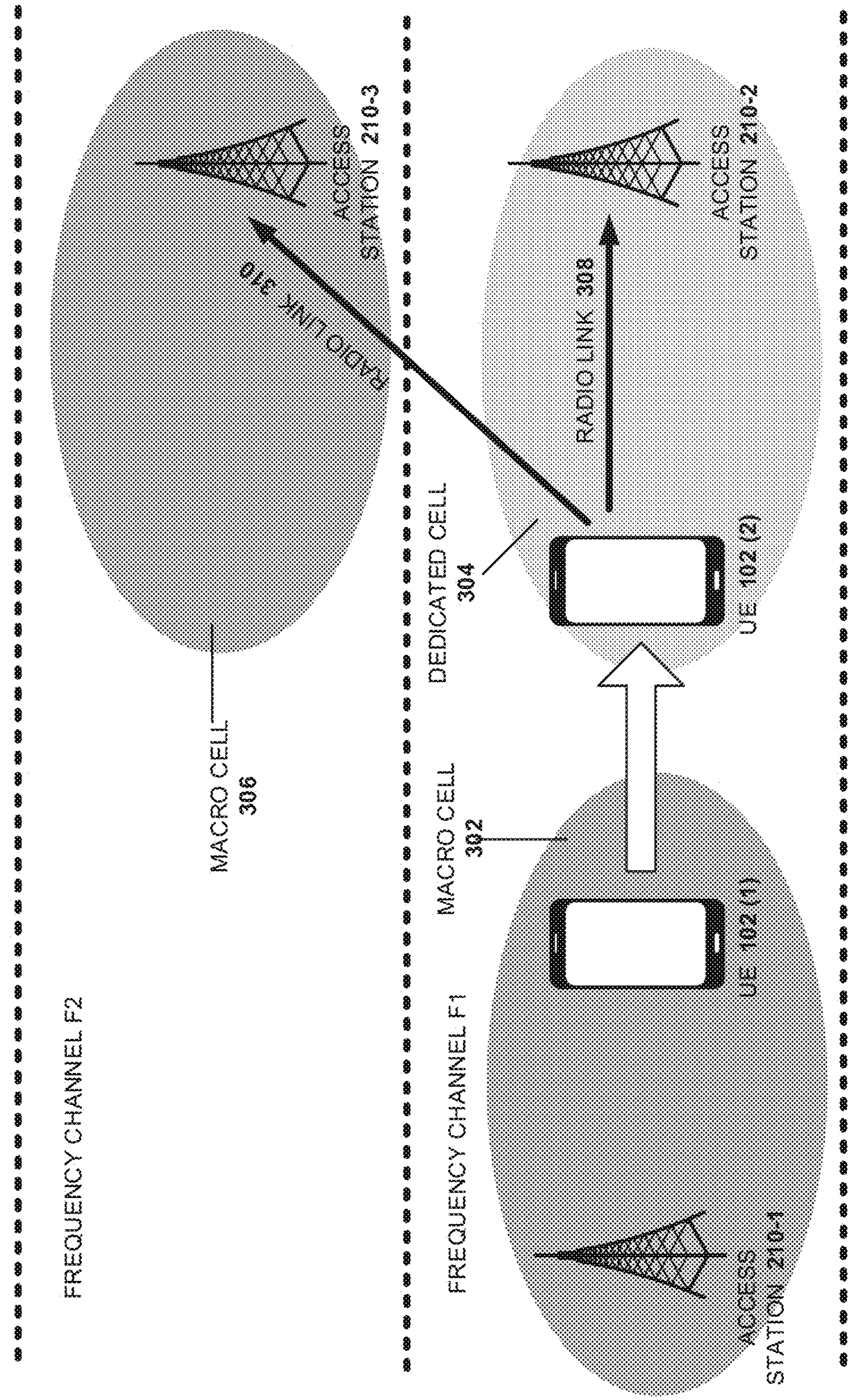
FIGS. 3-5 depict example applications of the systems described herein, according to an implementation.
Figure 4:
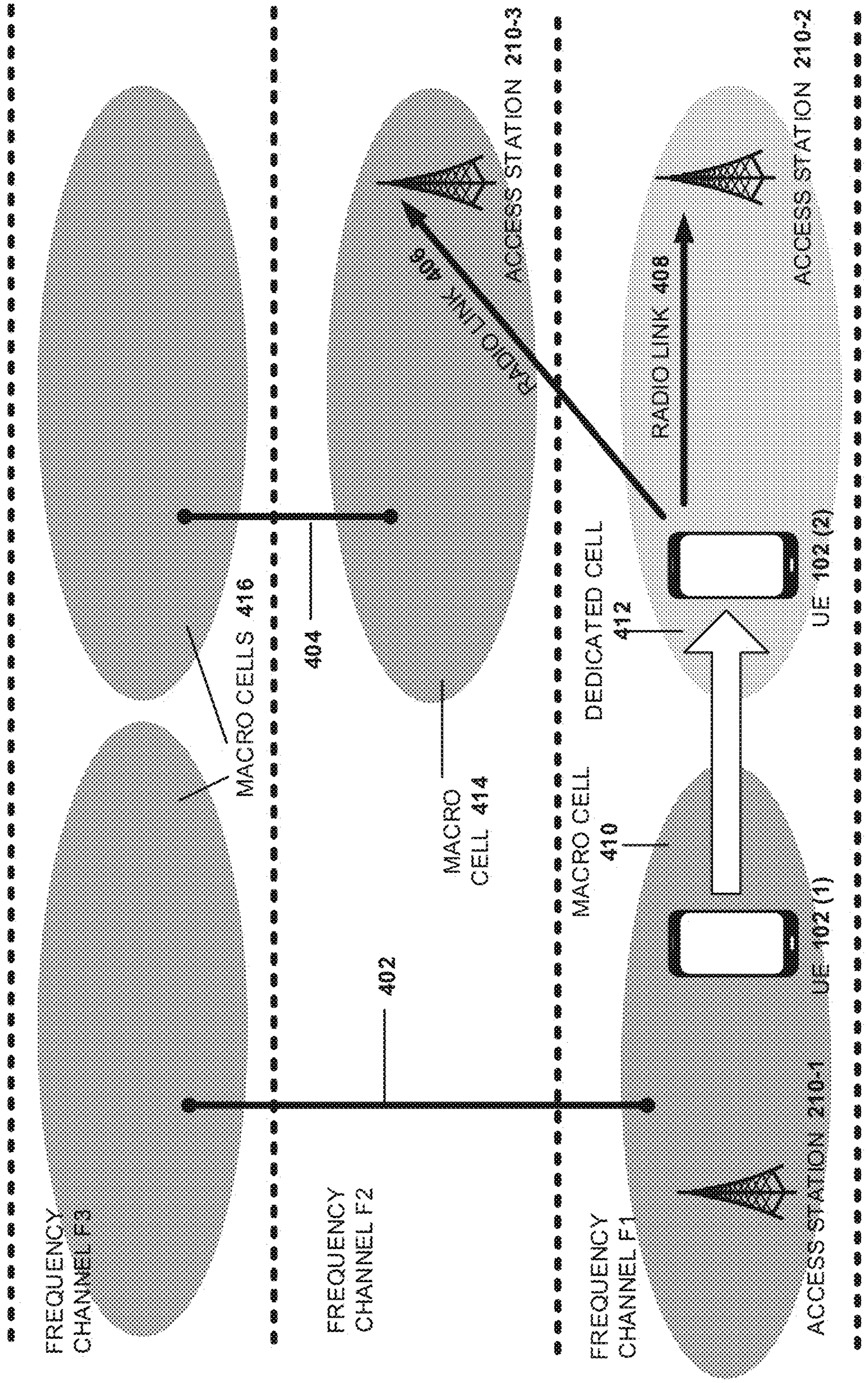
Figure 5:
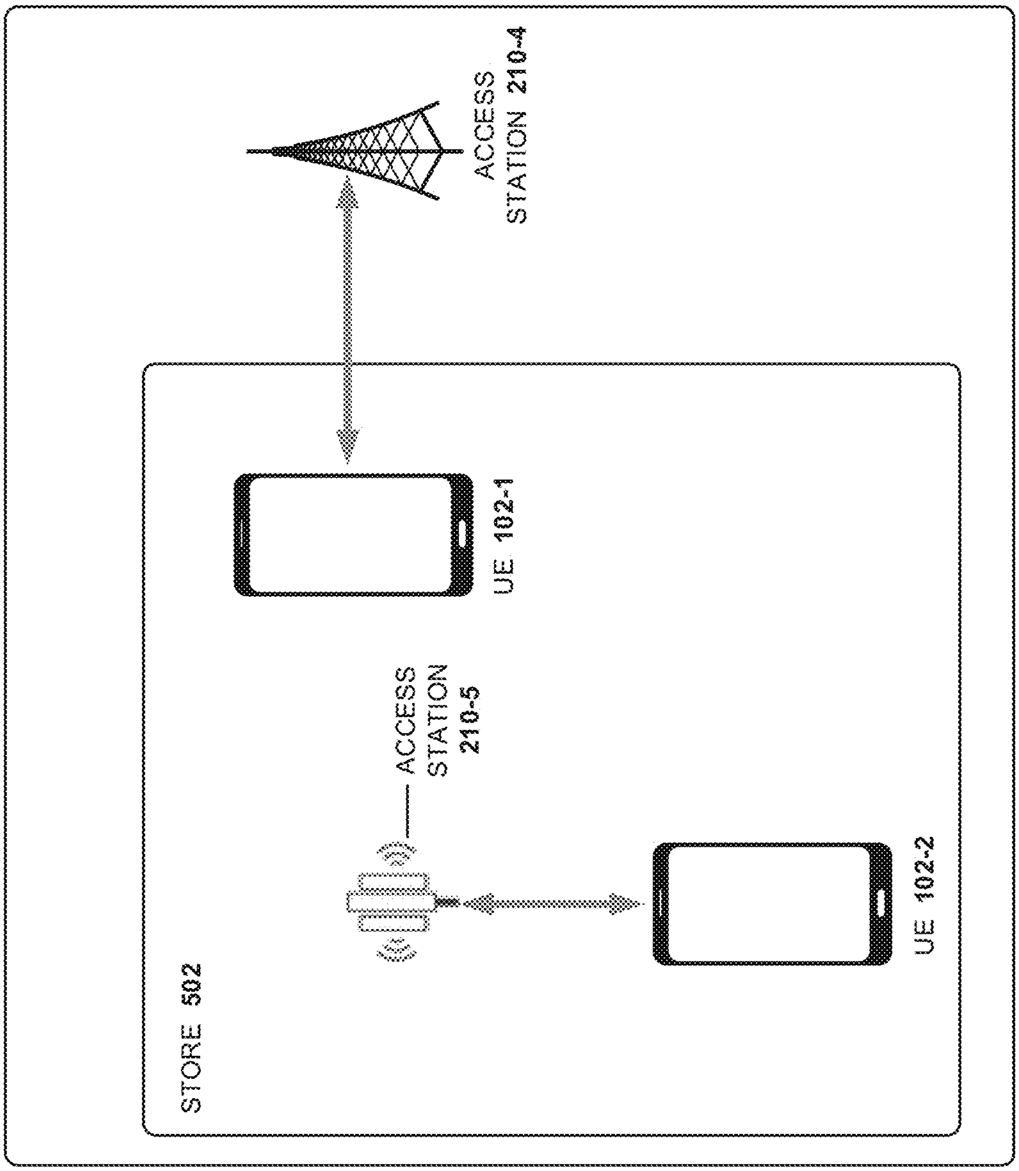

FIGS. 3-5 depict example applications of the systems described herein. FIG. 3 illustrates a use case 300. For case 300, assume that UE 102, whose user is subscribed to a public network, moves from within a macro cell 302 which operates in frequency channel F1 and belongs to a public network, toward a dedicated cell 304, which is in the coverage area of access station 210-2 and belongs to a dedicated network (e.g., a private network). Dedicated cell 304 operates in the same channel F1. Another macro cell 306 provides overlapping coverage with dedicated cell 304 and operates in a different channel F2. By default, UE 102 may establish a radio link 308 with access station 210-2. Assume that when UE 102 wishes to connect to access station 210-2, very little bandwidth may be left at access station 210-2 for public subscribers (i.e., subscribers of core network 206-1) as many private subscribers running enterprise applications may be connected to access station 210-2. As one way to address this issue, RAN coordinator 214 may obtain granular load information related to dedicated cell 304 from OAM 212-2 and provide the information to OAM 212-1. The information may include a breakdown of the loads according to different types of subscribers. In response, OAM 212-1 may configure access station 210-1 to instruct UE 102 to search for and prioritize another frequency channel F2 when leaving the coverage of cell 302, by having access station 210-1 change the cell reselection and/or handover settings. The reconfiguration may cause UE 102 to establish a radio link 310 with public access station 210-3 in channel F2 and allow dedicated access station 210-2 to retain radio resources for critical enterprise needs.

FIG. 4 illustrates a use case 400. For case 400, assume that UE 102 (e.g., an LTE and 5G Non Standalone (NSA) capable device used by a public subscriber) is in a macro cell 410. Macro cell 410 operates in LTE frequency channel F1 and has EN-DC connectivity to a macro cell 416. Macro cell 416 operates in NR frequency channel F3 (e.g., NR mid-band spectrum) and offers high throughput to UE 102. UE 102 then moves from macro cell 410 toward a dedicated cell 412 (coverage area of access station 210-2) operating in the same LTE channel F1. Assume that at that time, dedicated cell 412 is not experiencing high load. By default, UE 102 may establish a radio link 406 with access station 210-2. However, due to high transport delay (or other backhaul-related limitations), dedicated cell 412 does not have the capability to anchor an EN-DC connection to NR macro cells 416. RAN coordinator 214 may indicate the condition of access station 210-2 not having EN-DC capability to OAM 212-1. OAM 212-1 in turn may configure access station 210-1 to direct UE 102 to another macro cell 414 (coverage area of access station 210-3) which operates in LTE channel F2 and has overlapping coverage with dedicated cell 412. More specifically, OAM 212-1 may cause access station 210-1 to change the cell reselection and/or handover settings. Macro cell 414 may offer EN-DC connectivity with macro cells in channel F3, thus allowing UE 102 to preserve its high throughput when it connects to access station 210-3 via radio link 408.

FIG. 5 illustrates a use case 500. For case 500, assume that an NHN includes access station 210-5 (e.g., a small cell eNB/gNB) that operates in the Citizen Broadband Radio System (CBRS) band. Access station 210-5 is deployed inside a retail store 502, for example. Access station 210-5 may provide improved coverage to the shoppers, such as a user of UE 102-2, for all major carriers (MNOs).

Later, one of the MNOs (MNO 1) deploys an access station 210-4 (e.g., a gNB) that operates in NR mid-band spectrum and has the potential to offer high throughput, less than one mile from store 502. Since the mid-band signal penetrates inside store 502 to some extent, NR-capable devices subscribed to MNO 1, such as UE 102-1, may enjoy higher bandwidths by staying on the macro network, at least when access station 210-4 is lightly loaded and/or the NHN is highly loaded. However, by default all UEs 102 are pushed toward the CBRS band as soon as UEs 102 enter the store and detect a strong signal from access station 210-5 of the NHN. Based on the knowledge about the new access station 210-4, load information, and network analytics, RAN coordinator 214 may determine (e.g., using program logic or artificial intelligence/machine learning (AI/ML)) and issue a recommendation to OAMs 212, to stop pushing NR-capable UEs 102 subscribed to MNO 1 to access station 210-5 while continuing to guide only LTE UEs 102 and NR-capable UEs 102 subscribed to other MNOs toward access station 210-5.

FIG. 6 shows a table 600 that summarizes example UE steering performed by RAN coordinator 214 for use case 500 illustrated in FIG. 5. That is, in use case 500, RAN coordinator 214 may guide UEs 102 toward the NHN or the macro network in accordance with table 600. As shown, for NR-capable device that is a subscriber of MNO1, such as UE 102-1, RAN coordinator 214 may instruct the OAMs of the macro network and the NHN so that the networks operate as follows: when the load at the macro network (e.g., access network 210-1) is high, push the UE 102 toward NHN (access network 210-2), but when the load is low, do not push UE 102 toward the NHN. As also shown, for LTE-capable UEs 102 (subscriber of any MNOs) or NR-capable UEs 102 (subscriber of other MNOs), RAN coordinator 214 may instruct the OAMs of the macro network and the NHN so that the networks operate as follows: push UEs 102 toward NHN regardless of whether the load is low or high at the macro network.

FIG. 7 illustrates a table 700 of input to and output from RAN coordinator 214. RAN coordinator 214 may receive its input from OAMs 212 and one or more NEFs 216 and NWDAFs 218. As shown, table 700 includes three columns: a control domain column, an input column, an action column, and an output column. Each item (corresponding to a row) of the control domain column corresponds to the type of control that RAN coordinator 214 is to exert over access networks 204 (e.g., a macro network and a dedicated network). As further shown, the control domain column includes a mobility and load balancing domain, a CA/DC and load balancing domain, and a QoS domain. For each of the control domains, RAN coordinator 214 may receive a set of input (as shown by the input column), determine one or more actions to be taken by access stations 210 based on the input (as illustrated by the action column), and provide the output (as illustrated by the output column) to OAMs 212 to cause the actions to occur.

The mobility and load balancing domain relates to UE mobility and traffic balancing across different access stations 210. To control the mobility and load balancing domain, as shown by the input column, RAN coordinator 214 may receive, as input, the current capacity of access station 210-2 (e.g., a dedicated cell) for public subscribers and predicted capacities of access station 210-2 for private subscribers. The corresponding actions to be performed by the macro and dedicated cells (indicated in the action column) may include, for example, keeping public subscribers, which are moving toward a dedicated station 210-2, on access station 210-1 (macro cell) for a longer period of time; and/or pushing the public subscribers to another access station 210-3 (macro cell) with overlapping coverage with dedicated station 210-2. To effect these actions, RAN coordinator 214 may output (as indicated in the output column) new values of idle mode cell reselection attributes, such as threshX_high parameter value, for the frequency of dedicated station 210-2 by increasing the parameter value by some amount (e.g., 5 dB), to be applied to the macro cell. In addition, the output may include new values for connected-mode handover attributes, such as Event A5 threshold2 parameter value for the frequency of dedicated station 210-2, raised by an amount (e.g., 3 dB) and Event A5 threshold1 parameter value decreased by another amount (e.g., 2 dB), also to be applied to the macro cell. Idle mode cell reselection attributes and connected mode handover attributes are examples of mobility parameters.

The CA/DC and load balancing domain relates to load balancing UEs 102 across cells with different CA/DC capabilities while maximizing UEs 102 aggregate bandwidth. To control the CA/DC and load balancing domain, as shown by the input column, RAN coordinator 214 may receive, as input, an indication that a target dedicated cell does not have an EN-DC capability toward macro mid-band cells; and an indication that the dedicated cell has an intra-band CA capability with a predicted capacity lower than that for the macro mid-band. The corresponding actions (indicated in the action column) may include, for example, keeping public subscribers, which are moving toward a dedicated network, on the source macro cell for a longer period of time; and steering/pushing them to another macro cell with the EN-DC capability with the mid-band. To cause these actions to occur, RAN coordinator 214 may output (as indicated in the output column) similar parameter values as that indicated above for the mobility and load balancing domain. In addition, RAN coordinator 214 may output the EN-DC relations (or the lack thereof) configured on a target dedicated cell. The EN-DC relations on dedicated cell 210-2 may be used as an otherwise missing input to OAM 212-1 for an "EN-DC anchor mobility" feature with proprietary RAN vendor implementation, available on macro access stations 210-1 and 210-3.

The QoS domain relates to providing for consistent QoS across RANs. To control the QoS domain, as shown by input column, RAN coordinator 214 may receive as input QoS Class Indices (QCIs), Allocation Retention Priorities (ARPs), Guaranteed Bit Rates (GBRs), and/or Aggregate Maximum Bit Rates (AMBRs), per Mobile Network Operator (MNO) policy. The corresponding actions (indicated in the action column) may include, for example, identifying possible discrepancies in QoS attributes for similar services across MNOs and forcing the schedulers running on dedicated cells, to treat traffic in a fair manner across the dedicated nodes. To effect these actions, RAN coordinator 214 may output (as indicated in the output column): the corresponding QoS indicators (QCIs or 5QIs) from MNO1 and MNO2. For example, if MNO1 and MNO2 use QCI 8 and QCI 9, respectively, for the same service, RAN coordinator 214 may map MNO2 to QCI 8 on the dedicated nodes to align scheduler priorities.

Figure 8:
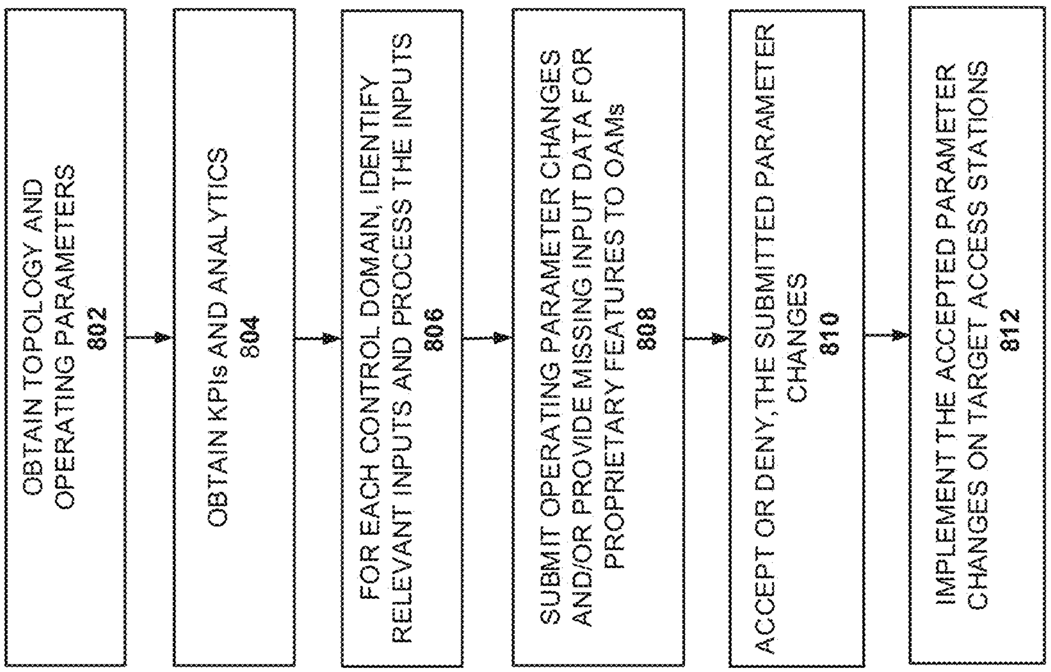
FIG. 8 is a flow diagram of an exemplary process that is associated with a RAN coordinator, according to an implementation.

FIG. 8 is a flow diagram of an exemplary process 800 that is associated with RAN coordinator 214, according to an implementation. Process 800 may be performed by RAN coordinator 214, in combination with one or more of the devices and/or components illustrated in FIG. 2. As shown, process 800 may include RAN coordinator 214 obtaining access network topologies and access station operating parameter values from one or more OAMs 212 (block 802). Alternatively or additionally, RAN coordinator 214 may obtain the parameters directly via one or more NEF 216.

In addition to obtaining the topologies and operating parameter values, RAN coordinator 214 may obtain network analytics and KPIs (block 804) from OAMs. Alternatively or additionally, RAN coordinator 214 may obtain the KPIs via one or more NWDAF 218. Some examples of KPIs have been described above with reference to NWDAF 218.

Process 800 may further include RAN coordinator 214 processing the identified inputs for each of the control domains (block 806). For example, RAN coordinator 214 may identify the inputs for the mobility and load balancing domain, the CA/DC and load balancing domain, and/or the QoS domain (see FIG. 7) for causing particular actions to take place in light of the topology, operating parameters, network analytics and KPIs. In addition, RAN coordinator 214 may process the inputs to generate outputs. In one example, as illustrated in FIG. 7 for the mobility and load balancing control domain, inputs may include the current cell capacities at access stations 210 (e.g., macro cells and dedicated cells). In response, RAN coordinator 214 may process the inputs to determine outputs for effecting the appropriate actions by the relevant access stations 210) (e.g., to steer UEs 102 toward the macro cells).

Process 800 may further include submitting, as its outputs, operating parameter changes and/or otherwise missing data for RAN vendor proprietary features to OAMs 212 (block 808). For example, RAN coordinator 214 may submit cell reselection parameter values, such as threshX_high, Event A5 threshold1 and threshold2, etc. to OAMs 212.

When OAMs 212 receives the output (i.e., new operating parameter values) from RAN coordinator 214, each OAM 212 may accept or deny/reject the submitted parameter changes (block 810), depending various factors, such as predefined rules or manual approval by an administrator of that OAM. Furthermore, OAMs 212 may implement the accepted parameter changes on target access stations 210 (block 812) (e.g., reconfigure the access stations 210 that the OAM 212 manages). As a consequence of the OAM 212 reconfiguring the access stations 210, the access stations 210 may perform the actions determined by RAN coordinator (block 812). For example, macro and dedicated access stations 210 may load balance UEs 102 across CBRS and mid-band to permit the users of UEs 102 connecting to the access stations 210 to experience maximum throughput and/or minimum latency.

Figure 9:
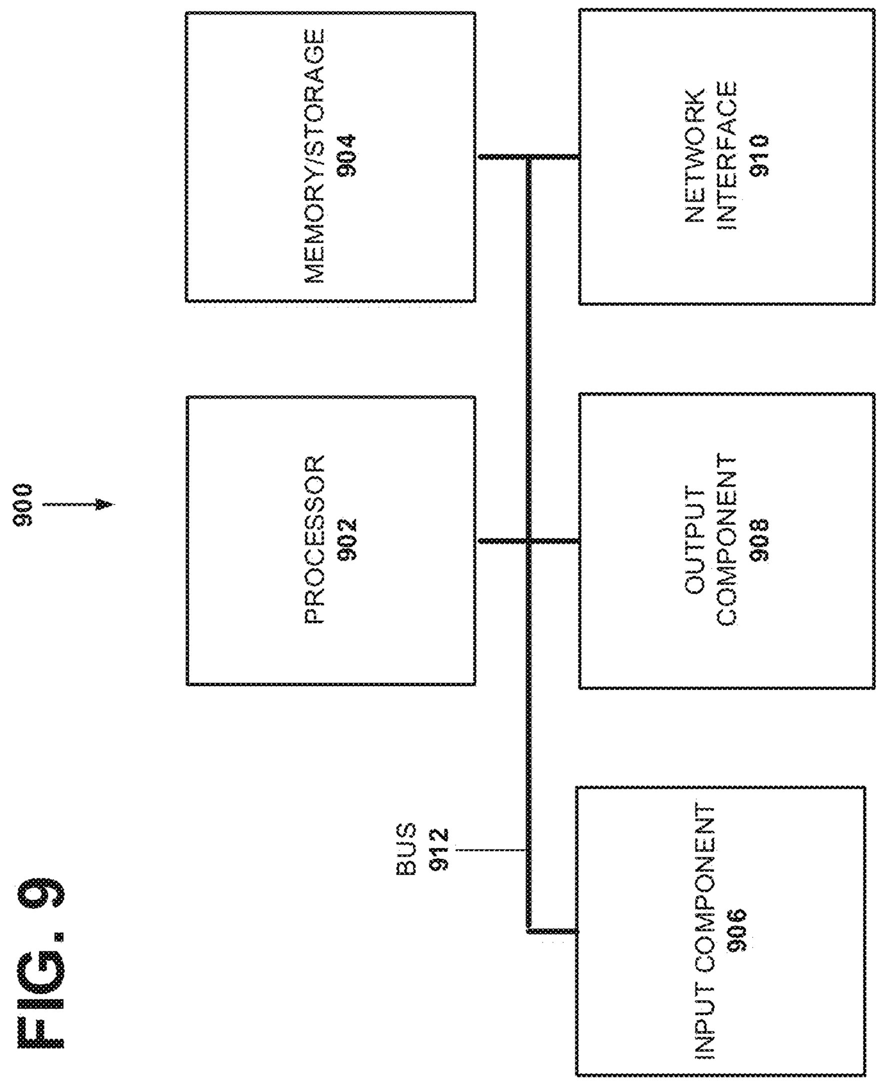
FIG. 9 depicts exemplary functional components of a network device according to an implementation.

FIG. 9 depicts exemplary components of an exemplary network device 900. Network device 900 may correspond to or be included in any of the devices and/or components illustrated in FIGS. 1-5 (e.g., UE 102, access networks 204, core networks 206, data networks 208, access stations 210). In some implementations, network devices 900 may be part of a hardware network layer on top of which other network layers and network functions (NFs) may be implemented. As shown, network device 900 may include a processor 902, memory/storage 904, input component 906, output component 908, network interface 910, and communication path 912. In different implementations, network device 900 may include additional, fewer, different, or different arrangement of components than the ones illustrated in FIG. 9. For example, network device 900 may include line cards, switch fabrics, modems, etc.

Processor 902 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 900 and/or executing programs/instructions.

Memory/storage 904 may include static memory, such as read only memory (ROM), and/or dynamic memory, such as random access memory (RAM), or onboard cache, for storing data and machine-readable instructions (e.g., programs, scripts, etc.). Memory/storage 904 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 904 may be external to and/or removable from network device 900. Memory/storage 904 may include, for example, a Universal Serial Bus (USB) memory stick, a dongle, a hard disk, off-line storage, a Blu-Ray® disk (BD), etc. Memory/storage 904 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 906 and output component 908 may provide input and output from/to a user to/from network device 900. Input/output components 906 and 908 may include a display screen, a keyboard, a mouse, a speaker, a microphone, a camera, a DVD reader, USB lines, and/or other types of components for obtaining, from physical events or phenomena, to and/or from signals that pertain to network device 900.

Network interface 910 may include a transceiver (e.g., a transmitter and a receiver) for network device 910 to communicate with other devices and/or systems. For example, via network interface 910, network device 900 may communicate over a network, such as the Internet, an intranet, cellular, a terrestrial wireless network (e.g., a WLAN, WIFI, WIMAX, etc.), a satellite-based network, optical network, etc. Network interface 910 may include a modem, an Ethernet interface to a LAN, and/or an interface/connection for connecting network device 900 to other devices (e.g., a Bluetooth interface).

Communication path or bus 912 may provide an interface through which components of network device 900 can communicate with one another.

Network device 900 may perform the operations described herein in response to processor 902 executing software instructions stored in a non-transient computer-readable medium, such as memory/storage 904. The software instructions may be read into memory/storage 904 from another computer-readable medium or from another device via network interface 910. The software instructions stored in memory/storage 904, when executed by processor 902, may cause processor 902 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while series of actions described with reference to FIG. 8, the order of the actions may be modified in other implementations. In addition, non-dependent actions may represent actions that can be performed in parallel and in different orders. Furthermore, each action may include one or more other actions.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:

a processor configured to:

receive first network parameters and first performance indicators of a first access station in a first radio access network (RAN) included in a first cellular network;

receive second network parameters and second performance indicators of a second access station in a second radio access network (RAN) included in a second cellular network;

determine whether to steer a User Equipment device (UE) wirelessly connected to the first access station, from the first access station toward the second access station, based on the first network parameters, first performance indicators, the second network parameters, and the second performance indicators; and based on the determination, modify one or more of:

the first network parameters of the first access station; and the second network parameters of the second access station, wherein the first cellular network is different from the second cellular network.

2. The device of claim 1, wherein when determining whether to steer the UE, the processor is to do at least one of:

determine whether to steer the UE based on mobility;

determine whether to steer the UE based on load balancing;

determine whether to steer the UE based on carrier aggregation (CA)/Dual Connectivity (DC); or map a Quality-of-Service Class identifier (QCI) or Fifth Generation Qualify-of-Service identifier (5QI) used at the first access station to another QCI or 5QI to be used at the second access station.

3. The device of claim 1, wherein when modifying one or more of the first network parameters of the first access station and the second network parameters of the second access station, the processor is to:

instruct a device to modify at least the mobility parameters at the first access station to force the UE to use particular frequency band at the second access station; or instruct the device to modify at least the mobility parameters at the first access station to force the UE to remain connected to the first access station;

wherein the mobility parameters include idle mode cell reselection and connected mode handover attributes.

4. The device of claim 1, wherein when receiving the first network parameters, the processor is to:

receive the first network parameters of the first access station via a first Operation Administration and Maintenance system (OAM) coupled to the first access station; and store the first network parameters.

5. The device of claim 4, wherein the second access station is coupled to a second OAM, and wherein the processor is to:

provide the first network parameters to the second OAM.

6. The device of claim 5, wherein when determining whether to steer the UE, the processor is to:

evaluate loads on the first access station and the second access station per public subscribers and private subscribers or per subscribers of each of one or more Mobile Network Operators (MNOs).

7. The device of claim 5, wherein the processor is further to:

apply a filter to or aggregate the first performance indicators to obtain indicators that comply with privacy rules; and provide the filtered or aggregated first performance indicators to the second OAM.

8. The device of claim 5, wherein the processor is further configured to:

expose one or more of the second network parameters of the second access station; and receive input for submitting changes to the second OAM for at least one of the second network parameters of the second access station; and effect the submitted changes to the second access station if automatically approved by the second OAM or manually approved by an administrator of the second OAM.

9. The device of claim 1, wherein when determining whether to steer the UE, the processor is to:

apply a Self-Organizing Network (SON) algorithm or a Machine Learning (ML) algorithm to process the first network parameters, the first performance indicators, the second network parameters, and the second performance indicators.

10. The device of claim 1, wherein when the first network parameters and performance indicators include object structure and nomenclature proprietary to a vendor, the processor is configured to identify network parameters and performance indicators as inputs for the device, wherein the identified network parameters include at least one of:

topology information;

carrier frequency information;

neighboring/dual-connectivity relations; or operating parameters, which govern mobility, load balancing, and Quality-of-Service (QOS), obtained from parameters proprietary to the vendor; and wherein the identified performance indicators include at least one of:

load information;

resource utilization information;

a handover success rate;

a dropped call rate;

a throughput; or latency.

11. A method comprising:

receiving first network parameters and first performance indicators of a first access station in a first radio access network (RAN) included in a first cellular network;

receiving second network parameters and second performance indicators of a second access station in a second radio access network (RAN) included in a second cellular network;

determining whether to steer a User Equipment device (UE) wirelessly connected to the first access station, from the first access station toward the second access station, based on the first network parameters, first performance indicators, the second network parameters, and based on the determination, modifying one or more of:

the first network parameters of the first access station; and the second network parameters of the second access station, wherein the first cellular network is different from the second cellular network.

12. The method of claim 11, wherein determining whether to steer the UE comprises at least one of:

determining whether to steer the UE based on mobility;

determine whether to steer the UE based on load balancing;

determining whether to steer the UE based on carrier aggregation (CA)/Dual Connectivity (DC); or mapping a Quality-of-Service Class identifier (QCI) or Fifth Generation Qualify-of-Service identifier (5QI) used at the first access station to another QCI or 5QI to be used at the second access station.

13. The method of claim 11, wherein modifying one or more of the first network parameters of the first access station and the second network parameters includes:

instructing a device to modify at least the mobility parameters at the first access station to force the UE to use particular frequency band at the second access station; or instructing the device to modify at least the mobility parameters at the first access station to cause the UE to remain connected to the first access station;

wherein the mobility parameters include idle mode cell reselection and connected mode handover attributes.

14. The method of claim 11, wherein receiving the first network parameters includes:

receiving the first network parameters of the first access station via a first Operation Administration and Maintenance system (OAM) coupled to the first access station; and store the first network parameters.

15. The method of claim 14, wherein the second access station is coupled to a second OAM, and wherein the method further comprises:

providing the first network parameters to the second OAM.

16. The method of claim 15, wherein determining to steer the UE includes:

evaluating loads on the first access station and the second access station per public subscribers and private subscribers or per subscribers of each of one or more Mobile Network Operators (MNOs).

17. The method of claim 15, further comprising:

applying a filter to or aggregate the first performance indicators to obtain indicators that comply with privacy rules; and providing the filtered or aggregated first performance indicators to the second OAM.

18. The method of claim 11, wherein determining whether to steer the UE comprises:

applying a Self-Organizing Network (SON) algorithm or a Machine Learning (ML) algorithm to process the at least first network parameters and first performance indicators and the at least second network parameters and second performance indicators.

19. The method of claim 11, wherein the first network parameters and performance indicators include object structure and nomenclature proprietary to a vendor, and wherein the method further comprises identifying network parameters and performance indicators as inputs for the device, wherein the identified network parameters include at least one of:
- topology information;
- carrier frequency information;
- neighboring/dual-connectivity relations; or
- operating parameters, which govern mobility, load balancing, and Quality-of-Service (QOS), obtained from parameters proprietary to the vendor; and wherein the identified performance indicators include at least one of:
- load information;
- resource utilization information;
- a handover success rate;
- a dropped call rate;
- a throughput; or
- latency.

20. A non-transitory computer-readable medium comprising one or more processor-executable instructions, when executed by a processor, cause the processor to:

Receive first network parameters and first performance indicators of a first access station in a first radio access network (RAN) included in a first cellular network;

Receive second network parameters and second performance indicators of a second access station in a second radio access network (RAN) included in a second cellular network;

determine whether to steer a User Equipment device (UE) wirelessly connected to the first access station, from the first access station toward the second access station, based on the at least first and second network parameters and first and second performance indicators; and determining whether to steer a User Equipment device (UE) wirelessly connected to the first access station, from the first access station toward the second access station, based on the first network parameters, first performance indicators, the second network parameters, and based on the determination, modify one or more of:
- the first network parameters of the first access station; and
- the second network parameters of the second access station, wherein the first cellular network is different from the second cellular network.

* * * * *